Figure 1:
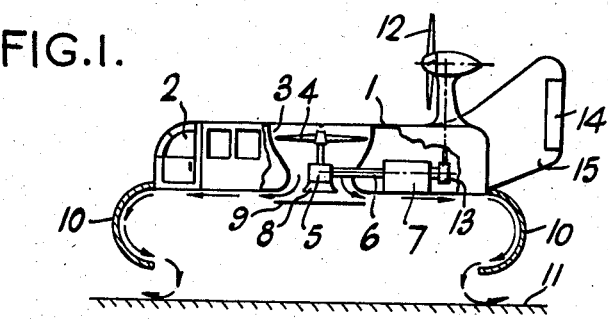

May 11, 1965　　　C. S. COCKERELL　　　3,182,740
VEHICLES FOR TRAVELLING OVER LAND AND/OR WATER
Filed Dec. 10, 1963　　　　　　　　　　　　2 Sheets-Sheet 1

INVENTOR
C. S. COCKERELL
BY
Cameron, Kerkam & Sutton
ATTORNEYS

May 11, 1965   C. S. COCKERELL   3,182,740
VEHICLES FOR TRAVELLING OVER LAND AND/OR WATER
Filed Dec. 10, 1963   2 Sheets-Sheet 2
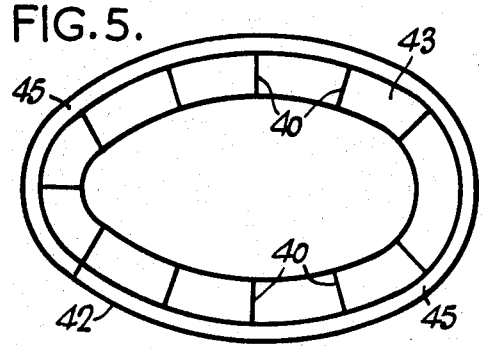
FIG.5.
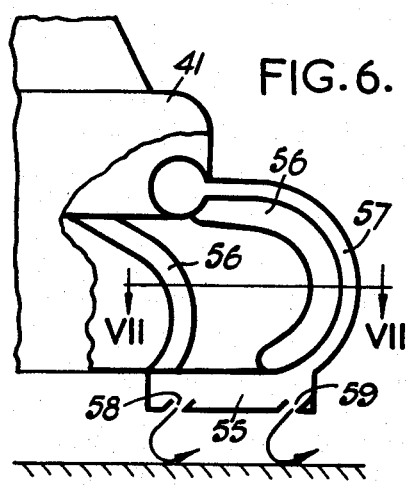
FIG.6.
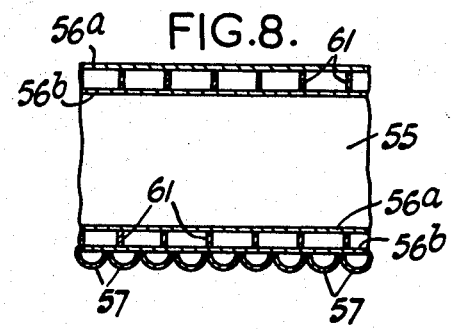
FIG.8.
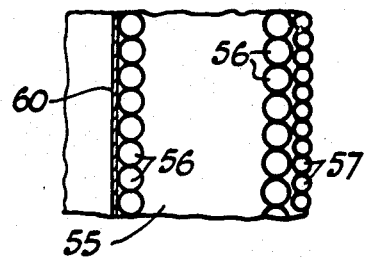
FIG.7.
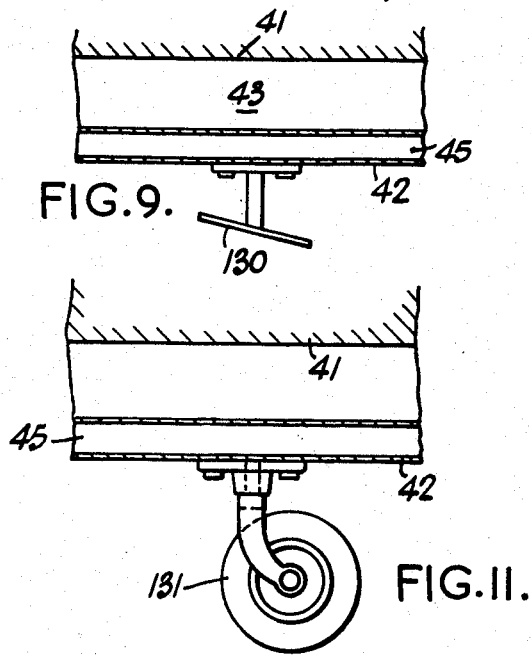
FIG.9.
FIG.10.
FIG.11.
INVENTOR
C. S. COCKERELL
BY
Cameron, Kerkam & Sutton
ATTORNEYS

# United States Patent Office 3,182,740
Patented May 11, 1965

3,182,740
VEHICLES FOR TRAVELLING OVER
LAND AND/OR WATER
Christopher Sydney Cockerell, Bassett, Southampton, England, assignor to Hovercraft Development Limited, London, England, a British company
Filed Dec. 10, 1963, Ser. No. 329,562
Claims priority, application Great Britain, Sept. 1, 1958, 27,978/58
19 Claims. (Cl. 180—7)

This is a continuation-in-part of application Serial No. 837,502, filed September 1, 1959, and relates to vehicles for travelling over land and/or water of the kind described in co-pending application Serial No. 627,925, filed December 12, 1956, corresponding to British Patent No. 845,211. In such a vehicle means are arranged to discharge at least one jet of fluid in the form of, or which results in the formation of, a curtain which effectively encloses a space beneath the underside of the vehicle and a surface over which the vehicle is to hover or travel, the discharging means being arranged to expel the jet of fluid with a total thrust which is substantially less than the total weight of the vehicle, and the arrangement being such that, when the discharging means is in operation and the curtain of fluid is formed, pressures can be built up within the said space to the extent that is necessary to support or assist in supporting the vehicle out of contact with the surface. The term "vehicle" as used herein is to be understood as including a platform or the like which is supported above the land or water as described above but it is normally intended to remain stationary, for example, for supporting radar installations.

As described in the aforesaid application the curtain-forming fluid issues from a port or ports in or near the bottom of the vehicle or at least substantially below its centre of gravity. The height (herein called the hoverheight) at which the bottom of the body of the vehicle is spaced from the surface when equilibrium conditions have been reached is a function of the thrust with which the fluid jet is ejected, the said thrust being one of the limiting factors governing the maximum vertical height of the curtain. The larger the thrust with which the fluid jet is expelled the stronger or stiffer the curtain will be, and it is therefore possible for the vehicle to operate at a greater hoverheight before the curtain loses its capacity to contain the cushion of fluid beneath the vehicle. Increasing the thrust of the fluid jet requires an increase in power requirements. An object of the present invention is to enable the main body of the vehicle to ride without damage or undue accelerations over waves or other obstructions without increasing the thrust of the fluid jet to a value which would otherwise be necessary to provide a sufficient hoverheight to clear such obstructions.

A further object of the invention is to improve the efficiency of such cushion supported vehicles by enabling their underparts to conform more closely to the surface over which they are travelling.

Another object of the invention is to reduce the risk of damage to the underparts of such a vehicle by impact with obstructions or irregularities on the surface over which it is travelling.

A still further object of the invention is to enable the vehicle to ride over irregularities of the surface over which it is travelling without too much disturbing the trim of the vehicle.

The invention consists in a vehicle for travelling over a surface and adapted to be supported above said surface at least in part by a cushion of pressurised fluid contained below the vehicle in a cushion space located between the underside of the vehicle and the surface over which it is travelling comprising a flexible structure extending along the periphery of said cushion space and constituting an upper part of the peripheral boundary thereof and means for causing a curtain of moving fluid to issue from the lower portion of said flexible structure and flow towards said surface to form a lower part of the peripheral boundary of said cushion space.

Thus the upper part of the space within which the cushion of pressurised fluid is contained is bounded by a flexible structure which can yield on impact with an obstacle or can be caused to deflect upwardly to avoid impact, while the lower part of the space is bounded by the fluid curtain which, of course, can pass over obstacles without difficulty. In this way the thrust required for maintenance of the fluid curtain is only that required to produce a part of the clearance between the main structure of the vehicle and the surface over which it travels, the remainder of the total depth of the pressurised cushion being contained by the flexible structure which can adapt itself to irregularities in the surface or yield to impact with obstacles in its path without transmitting unacceptable shocks to the main structure of the vehicle.

The relative depths of the cushion retained by the flexible structure and by the fluid curtain, respectively, will depend upon the extent to which the flexible structure can conform to the irregularities of the surface or can be permitted to make contact with the surface. The combined depth of the flexible structure and the fluid curtain should be adequate to ensure that the hard or rigid structure of the vehicle is not in danger of being damaged by impact with the obstacles or irregularities likely to be encountered. The use of a combination of flexible skirt structures and fluid curtains in the manner contemplated by this invention enables an adequate depth of cushion to be achieved more economically of power than could be achieved using fluid curtains alone, or alternatively a greater depth of cushion can be achieved for the same expenditure of power, enabling the vehicle to ride over rougher surface conditions.

The flexible structures according to the invention may be made of flexible sheet material and may be or may include inflated elements, and will in general incorporate ducts or guiding surfaces for conducting the fluid forming the fluid curtain from a supply source on the vehicle to the lower boundary of the structure so that it will issue therefrom to form the curtain. They may extend all around the periphery of the cushion space and be located adjacent and cooperate with annular supply ducts by which the curtain forming fluid is delivered to the cushion periphery. Arrangements may be made for the flexible structures to experience a restoring force tending to maintain them in their undistorted configuration and restore them to their normal configuration after displacement by or for the accommodation of surface hazards. Such restoring forces may be provided by the contained fluid in the case of inflated structures or may be derived from the pressurized fluid forming the cushion. Forces tending to deflect parts of the structure to avoid contact with the surface may be derived from auxiliary pressurised cushions formed beneath the structures themselves as will appear hereinafter.

The fluid forming the fluid curtain may be air and this will be assumed for convenience of description hereinafter, although other fluids could be used, for example, the exhaust gases of an engine, or water.

The invention will be more readily understood by the following description, taken in conjunction with the accompanying drawings of some examples of vehicles according to the invention.

Figure 2:
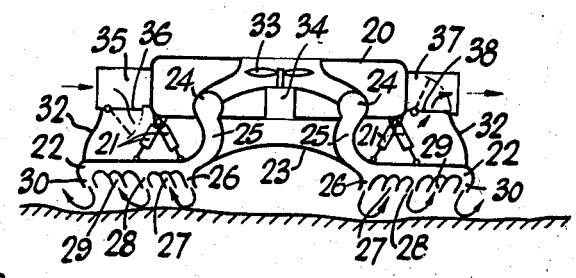
Figure 3:
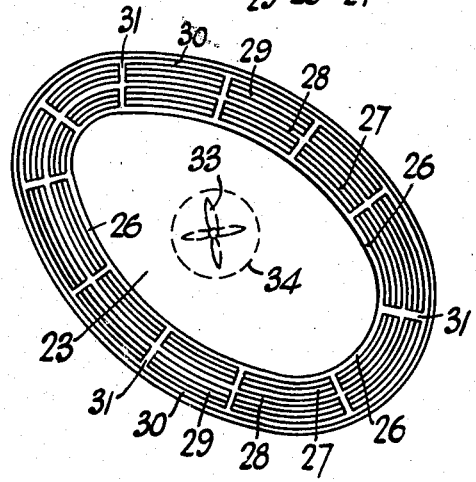
Figure 4:
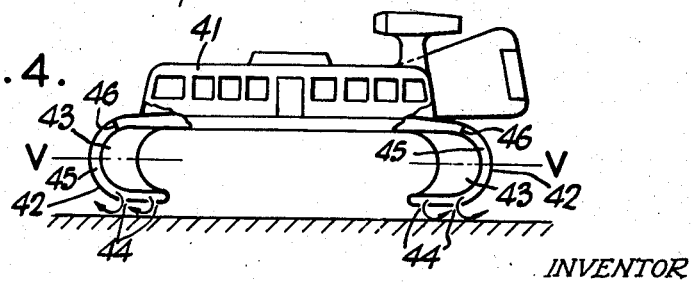

FIGURE 1 is a diagrammatic side elevation, partly in cross section, of a simple form of vehicle according to the invention, FIGURE 2 is a diagrammatic cross section of a further form of vehicle, FIGURE 3 is an inverted plan view of the embodiment of the invention shown in FIGURE 2, FIGURE 4 is a diagrammatic side elevation, partly in cross section, of yet a further form of vehicle, FIGURE 5 is a diagrammatic cross section on the line V—V of the vehicle according to FIGURE 4, FIGURE 6 is a diagrammatic partial cross section of yet another form of vehicle according to the invention, FIGURE 7 is a diagrammatic partial cross section on the line VII—VII of the vehicle shown in FIGURE 6, FIGURE 8 is a diagrammatic partial cross section of an alternative skirt construction for a vehicle according to FIGURE 6 and taken on the line VII—VII of that figure, FIGURES 9 and 10 are details showing the use of hydrofoils for the control of flexible duct sections, and FIGURE 11 is a further detail showing the use of a wheel for the control of a flexible duct section.

FIGURE 1 of the drawings shows a very simple type of vehicle according to the invention. It comprises a body structure 1 carrying a control cabin 2 and including passenger and/or cargo space. Through the centre of the body structure passes a duct 3 in which is mounted a fan 4 driven, through gear box 5 and shaft 6, by a motor 7 and serving to draw air down through the duct. At the lower end of the duct the air is deflected by the fairing 8 and by a deflector plate 9 so as to flow in radially outward directions over the under surface of the body structure.

Around the periphery of the body structure there is suspended a flexible skirt structure 10 which is shown as of curved cross section so as to present a concave surface towards the space beneath the vehicle. The skirt 10 may be made of any flexible sheet material such as rubber or canvas or composite structures in which, say, rubber is reinforced with cords or fabric. The air delivered by the fan 4 to the underside of the vehicle builds up a pressurized cushion within the space bounded by skirt 10 sufficient to raise the vehicle off the ground. The skirt 10 serves to retain the pressurised air under the vehicle. When the vehicle lifts off sufficiently the air flowing radially outwardly towards the periphery of the vehicle is deflected by the skirt 10 round and down so as to be directed inwardly from the lower edge of the skirt and to issue from the lower edge in the form of a curtain of air which itself serves to resist the flow of air outwardly from the pressurized cushion. The vehicle is thus lifted higher until there is a clear space between the lower edge of the skirt 10 and the ground. The air forming the curtain issuing from the lower edge of skirt 10 flows across the gap and is bent around by the pressure of the air within the space below the vehicle until it flows outwardly and escapes.

The vehicle is thus supported on a pressurised air cushion which is contained around the upper part of its periphery by a flexible skirt 10 and around the lower part of the periphery by a curtain of moving air. While so supported the vehicle may be driven over the surface of the ground 11 by means, for example, of an air screw 12 which either may be driven from the motor 7 through a further gearbox 13 or may be driven separately. The vehicle may be steered, for example, by means of a fin 14 mounted on a stabilising fin 15.

When so driven the vehicle will obviously ride without difficulty over any obstacles or irregularities on the surface 11 which are not high enough to be hit by the skirt 10. Higher obstacles will be hit by the skirt 10 but because of its flexibility the skirit 10 will yield and the vehicle will pass over the obstacle without suffering any undue shock.

Because of the concave shape of the skirt 10 the pressure of air within the cushion space below the vehicle will keep it inflated and distended to the shape shown and will restore it to its proper shape after it has been deflected by impact with an obstacle.

FIGURES 2 and 3 of the accompanying drawings show a more sophisticated arrangement according to the invention. In this embodiment the main body 20 of the vehicle carries hydraulic rams 21 mounted around the periphery of the body, being pivoted at their upper ends to the body 20 and at their lower ends to an annular duct 22. The rams act as supporting members for the duct 22 and may perform a control function on the duct as will be referred to hereinafter. The duct forms a flexible rim and the centre of the annulus formed by the duct is closed by a flexible membrane 23. Since the duct 22 is flexible and since the rams 21, which are mounted at various points around the periphery of the body 20 are pivotally connected to both the body and the duct it will be apparent that each portion of the duct to which a ram is connected is locally movable relative to the other portions. Air is supplied from a fan 33 driven by a motor 34 through ducts 24 in the body of the vehicle to the duct 22 by way of the flexible supply pipes 25. In this example, as shown in the cross section in FIGURE 2, the duct 22 is provided with a series of nozzles or ports 26, 27, 28, 29 and 30 by means of which a multiple system of air curtains is created. Air expelled from nozzle 26 is deflected and is collected by port 27. The air collected into port 27 may recirculate back into the air expelled from nozzle 26 or may be partly or wholly included in the air being expelled from nozzle 28 or even nozzle 30. A similar recirculation of the air expelled from port 28 is also obtained by collecting the deflected air flow in port 29. This form of curtain fluid recovery and recirculation is more fully described in co-pending application Serial No. 809,699, filed April 29, 1959. Transverse ports 31, shown in FIGURE 3, are also provided so as to produce transverse curtains which divide the main curtain system into air cells each bounded by its own system of fluid curtains. These air cells enhance the stability of the vehicle.

Thus, the space beneath the membrane 23 and bounded by the flexible duct 22 contains a cushion of pressurised air which supports the vehicle clear of the surface. The multiple air curtain system which has been described serves to retain this pressurised air curtain for a part of the vertical height of the periphery of the cushion. Above this height the peripheral boundary of the cushion is formed by the flexible nozzles 26, 27, 28, 29 and 30, projecting below the duct 22. Because of their flexible nature the nozzles can suffer contact with the surface over which the vehicle travels without sustaining damage but in the arrangement shown such contact is prevented or reduced by the formation of the air cells above referred to. Each such cell will experience an increase in pressure of the air within it if the clearance from the surface of the duct 22 tends to decrease at that point due, for example, to the vehicle tilting. This increase of pressure, acting upwardly on the duct system 22 will do two things. Firstly it will operate to deflect the duct upwardly so as to keep it out of contact with the surface and secondly it will exert, through the duct 22, a lifting force on the vehicle, tending to right it. The rams 21 provide a restoring force tending to maintain the duct 22 in a predetermined position relative to the main body of the vehicle. Alternatively they may be connected to a control system which includes sensing devices such as pressure transducers which sense changes in the pressure below the duct 22 and control the supply of pressure fluid to the rams on one side or the other of their pistons so as to raise or lower the duct appropriately.

In this embodiment the cushion of air supporting the vehicle is contained below the membrane 23 at the level of the duct system from which the curtain air issues. In such an arrangement the membrane would have to withstand the full pressure of the cushion, and the stresses could be very large and may necessitate a heavy form of construction. To avoid this the space between the membrane and the body of the vehicle is enclosed by a flexible member as shown at 32 and the enclosed space filled with air at a pressure which may be approximately equal to the normal cushion pressure so that the loads on the membrane are transmitted to the bottom of the vehicle body. The membrane can thus be of light construction.

In the example shown in FIGURES 2 and 3 of the drawings with flexible member 32, any sudden deflection up or down of any part of the duct is likely to cause rapid variations of pressure within the chamber between the membrane and the body of the vehicle, tending to produce undesirable movements of the vehicle body. To prevent or reduce this tendency large ports should be provided to allow air to enter or leave the chamber as its volume changes. As, however, the air in the chamber is intended to transfer the loads from the membrane to the bottom of the body of the vehicle, the air must be maintained at some definite pressure. It is possible to do this quite simply, when the vehicle is travelling, by locating the port for letting out the air from the chamber at the rear of the vehicle, and the inlet port at the front, using the ram pressure produced by movement of the vehicle through the atmosphere to maintain the pressure in the chamber. Any expulsion of air from the chamber through the port at the rear will assist in propelling the vehicle. The inlet is shown in FIGURE 2 in the form of a trunk 35, open towards the front of the vehicle and in its lower wall there is provided a vent communicating with the interior of the space beneath the vehicle and above the membrane 23. This vent is controlled by a flap 36 forming a non-return valve. The flap 36 is spring loaded (spring not shown) to close the vent in the absence of any air pressures. When a ram pressure is built up by movement of the vehicle forward this operates to open the valve and inflate the space beneath the vehicle, and when this pressure approaches the ram pressure the spring will close the valve and prevent escape of air through the vent. At the rear of the vehicle there is provided a further trunk 37 open towards the rear. This too has a vent communicating with the space beneath the vehicle and this vent is controlled by a flap valve 38 which is loaded by a spring (not shown) or by gravity to close the valve. When the pressure in the space beneath the vehicle exceeds a predetermined value the pressure on the flap 38 overcomes the loading and the valve opens to allow air to escape. The pressure within the chamber between the underside of the vehicle and membrane 23 is thus maintained at a substantially constant value.

A further alternative is to allow the cushion to occupy the whole space between the bottom of the body of the vehicle and the surface, being bounded at the sides by the curtain formation at the bottom and by a flexible gas tight member or skirt conveniently forming part of or being attached to the flexible duct supporting members. Such a construction is illustrated in the examples shown in FIGURES 4 to 8 of the drawings.

FIGURES 4 and 5 show an arrangement in which the rams 21 of the previous embodiment are dispensed with, a restoring force tending to maintain the flexible structure in its datum configuration, that is its normal operational configuration undeflected by surface irregularities or obstacles, being obtained, as in FIGURE 1, by pneumatic action. In the underside of the main body of the vehicle shown diagrammtically at 41 there is provided an annular port 46. Attached around the inner periphery of port 46 is a hollow flexible tubular structure 43 which is closed upon itself and arranged to be inflated to a pressure slightly less than that which will be set up in the pressurised cushion which it surrounds. The structure 43 may be completely sealed and permanently inflated or may be supplied with gas from the main compressor plant referred to below or from an auxiliary plant as may be convenient. For this reason the inner wall of the structure will assume a concave shape (as seen from within the cushion space) as shown. Surrounding the tubular structure 43 and attached to the outer margin of port 46 is an outer flexible skirt member 42 which forms between itself and the outer surface of tube 43 an annular flexible duct 45 by which air from a compressor plant (not shown) carried by the vehicle may be delivered to ports 44 located in the under surface of the duct where it curves under the tubular structure 43. Two ports 44 are shown and from them issue curtains of air, indicated by the arrows, which flow downwardly towards the ground and are bent round by the pressure of the air cushion within the space beneath the vehicle so as to finally flow outwardly away from the vehicle.

The region between the two curtains of air will assume a pressure intermediate that of the main supporting air cushion under the main structure of the vehicle and that of the surrounding atmosphere, this pressure acting upwardly on the under surface of the duct 45 between the ports 44. Therefore, if the vehicle tends to tilt downwards towards the ground at any given point around the periphery of the craft, the pressure within the region between the curtains will tend to rise and exert an increased upward force on the structure 43, 45 tending to lift it and maintain it out of contact with the ground surface.

The cross-sectional diagram of FIGURE 5 shows the plan shape of the tubular structure 43 surrounded by the duct 45. It also shows radial membranes 40 also of flexible material which are provided at spaced points around the flexible skirt or wall structure, dividing the space within the tubular structure 43 into a number of separate cells. Since each of these cells can sustain a pressure within itself different from that of its fellows it will be readily understood that an increased stability for the vehicle will be achieved since the increased pressure set up in one cell due to tilting of the vehicle will be retained at the location at which it is set up and will be fully effective at that point to exert an upward restoring force on the vehicle instead of being dissipated around the periphery as it would be in the absence of the membranes or diaphragms 40. The magnitude of this effect can of course be determined by suitable choice of the cell sizes and/or by permitting restricted flow of air between the cells by the provision, for example, of the holes in the diaphragms 40.

In a further example, shown in FIGURES 6, 7 and 8 of the accompanying drawings, a duct 55 is supported from the body 41 of the vehicle by means of hollow flexible members 56, containing pressurised air, the fluid supply for the curtains being fed to the duct by flexible pipes 57, and being expelled from ports 58 and 59 formed in the duct 55. Deflection of the duct 55 will cause distortion of the inflated members 56, a variation in pressure of the air in the members occurring and providing a restoring force. The hollow members 56 may be separate individual tubes as shown in the cross section of FIGURE 7, in which case they may be connected for example by a continuous membrane 60 attached to the inner members, or they may be annular in form, made for example from concentric tubes 56a and 56b of flexible impervious material as shown in FIGURE 8. In the latter case, it is preferable that the annular spaces thus formed should be divided into separate arcuate sections by membranes 61 as shown, to provide stability.

In the embodiments of FIGURES 2 and 3, FIGURES 4 and 5 and FIGURES 6, 7 and 8, instead of using the pressure variations beneath the duct sections to cause, directly or indirectly, the deflection of the structure carrying the duct, it is possible to use other means. When operating over water one may use surfaces or hydrofoils attached to the structure so as to ride in or on the water and impart the appropriate forces to the duct structure. When operating over land wheels or skids may be used.

FIGURE 9 shows a planing surface 130 fastened to the underside of a section of the duct 45 of FIGURE 4, being attached to the outer skirt member 42. The planing surfaces and hydrofoils may be single as shown in FIGURE 9 or multiple ones may be used as shown in FIGURE 10, placed one above the other so that as they become further immersed so a greater lifting force is provided.

When a vehicle according to the invention is used over land or a similar surface, some other means for deflecting the duct may be used such as wheels, skids, caterpillar tracks, etc. This produces a very convenient form of vehicle since, although it is desirable to support a large proportion of the total vehicle weight by means of the cushion of fluid beneath the vehicle, it is desirable to have some form of physical contact with the ground to provide resistance to sideways movement of the vehicle due, for example, to a side wind. It is therefore arranged that the cushion supports, say, 90% of the total weight of the vehicle, the wheels or the like supporting the remaining 10%. The wheels are attached to a duct flexibly supported from the body of the vehicle, which makes it unnecessary for the vehicle to operate at a height which avoids obstacles, thus requiring a large supply of power for providing the fluid flow for the formation of the curtains. It will be noted that with wheels attached to the duct flexibly supported below the body of the vehicle, the latter is analogous to the conventional forms of land transport in that the mobile or "unsprung" weight is reduced to a minimum. FIGURE 11 shows the attachment of a wheel 131 to a duct section of the kind shown in FIGURE 4.

I claim:

1. A vehicle for travelling over a surface and adapted to be supported above said surface at least in part by a cushion of pressurised fluid contained below the vehicle in a cushion space located between the underside of the vehicle and the surface over which it is travelling, comprising a flexible structure extending along the periphery of said cushion space and constituting an upper part of the peripheral boundary thereof, and means for causing a curtain of moving fluid to issue from the lower portion of said flexible structure and flow towards said surface to form a lower part of the peripheral boundary of said cushion space.

2. A vehicle for travelling over a surface and adapted to be supported above said surface at least in part by a cushion of pressurised fluid contained below the vehicle in a cushion space located between the underside of the vehicle and the surface over which it is travelling, comprising a flexible skirt structure surrounding the upper part of said cushion space, and means for causing fluid to flow down a surface of said skirt structure and issue below the lower edge thereof in the form of a curtain of moving fluid which flows towards the surface over which the vehicle travels to constitute with said skirt structure the peripheral boundary of said cushion space.

3. A vehicle for travelling over a surface and adapted to be supported above said surface at least in part by a cushion of pressurised fluid contained below the vehicle in a cushion space located between the underside of the vehicle and the surface over which it is travelling, comprising a flexible duct structure having spaced inner and outer walls of flexible material constituting a flexible skirt surrounding the upper part of said cushion space, and means for causing a fluid to flow down between said inner and outer walls and to issue from the lower edges thereof in the form of a curtain of moving fluid which flows towards the surface over which the vehicle travels and provides in combination with said duct structure a peripheral boundary for said cushion space.

4. A vehicle for travelling over a surface and adapted to be supported above said surface at least in part by a cushion of pressurised fluid contained below the vehicle in a cushion space located between the underside of the vehicle and the surface over which it is travelling wherein said cushion space is bounded peripherally at least in part by a flexible skirt structure, said vehicle including means for causing a curtain of moving fluid to issue from the lower part of the vehicle adjacent said skirt structure and flow towards said surface below said skirt structure to provide a further part of the peripheral boundary of said cushion space.

5. A vehicle for travelling over a surface and adapted to be supported above said surface at least in part by a cushion of pressurised fluid contained below the vehicle in a cushion space located between the underside of the vehicle and the surface over which it travels, comprising means at the periphery of said cushion space for containing said cushion, said means including a wall structure of flexible material having at least one fluid guiding surface, and means carried on said vehicle for delivering to said wall structure a supply of fluid and causing it to flow down the guiding surface of said wall structure and issue below said wall structure in the form of a curtain of moving fluid which flows towards the surface over which the vehicle travels, said wall structure and said fluid curtain constituting the upper and lower parts, respectively, of the cushion containing means.

6. A vehicle for travelling over a surface and adapted to be supported above said surface at least in part by a cushion of pressurised fluid contained below the vehicle in a cushion space located between the underside of the vehicle and the surface over which it is travelling, comprising a flexible skirt structure surrounding the upper part of said cushion space, flexible means for conducting fluid to the lower part of said skirt structure and causing it to issue therefrom so as to form a curtain of moving fluid extending below said flexible skirt structure and flowing towards the surface over which the vehicle travels, and means carried by the vehicle for delivering fluid to said fluid conducting means.

7. A vehicle as claimed in claim 6 wherein said flexible skirt structure comprises a hollow flexible structure forming the upper peripheral boundary of said cushion space.

8. A vehicle as claimed in claim 7 wherein the hollow flexible structure is tubular and closed upon itself and is inflated.

9. A vehicle as claimed in claim 8 wherein the hollow flexible structure includes a plurality of diaphragms which divide said structure into a plurality of separate compartments.

10. A vehicle as claimed in claim 6 wherein the flexible skirt structure carries at its free edge fluid discharge means, said means including spaced discharge ports from which are discharged fluid curtains defining between them a subsidiary cushion space outside the first said cushion space in which a cushion of pressurized fluid may be built up to act upon the underside of said fluid discharge means to deflect said flexible skirt structure upwards away from the surface.

11. A vehicle for travelling over a surface and adapted to be supported above said surface at least in part by a cushion of pressurised fluid contained below the vehicle in a cushion space located between the underside of the vehicle and the surface over which it is travelling, comprising an annular supply duct encircling said cushion space, means for delivering fluid to said duct, a flexible inflated structure attached to the underside of the vehicle against the inner margin of said supply duct, said structure having a downwardly and inwardly inclined outer wall and being divided by transverse diaphragms into separate compartments capable of sustaining at least temporarily different inflation pressures in successive compartments, and an outer flexible skirt surrounding said inflated structure and defining between itself and the outer wall of said inflated structure a downwardly and inwardly inclined duct for the supply of fluid from said supply duct to the lower part of said inflated structure to form a curtain of moving fluid flowing towards the surface over which the vehicle travels, said flexible inflated structure forming the upper part and said fluid curtain forming the lower part of the boundary of said pressurised cushion.

12. A vehicle for travelling over a surface and adapted to be supported above said surface at least in part by a cushion of pressurised fluid contained below the vehicle in a cushion space located between the underside of the vehicle and the surface over which it is travelling, comprising a flexible structure extending along the periphery of said cushion space and constituting an upper part of the peripheral boundary thereof, and means for causing a curtain of moving fluid to issue from the lower portion of said flexible structure and flow towards said surface to form a lower part of the peripheral boundary of said cushion space, said flexible structure comprising a plurality of wall members spaced apart in the radial direction with respect to said cushion space, a duct carried by said wall members, and means for supplying fluid to said duct, said wall members being composed at least in part of hollow flexible members.

13. A vehicle for travelling over a surface and adapted to be supported above said surface at least in part by a cushion of pressurised fluid contained below the vehicle in a cushion space located between the underside of the vehicle and the surface over which it is travelling, comprising a flexible duct structure, said structure including a plurality of concentric annular flexible nozzles surrounding said cushion space, means for supplying fluid to at least some of said nozzles to issue therefrom as curtains of fluid flowing towards the surface over which the vehicle travels, and a flexible membrane bridging the space surrounded by said duct structure, said membrane forming the upper boundary, and said nozzles forming the upper part and said fluid curtains the lower part of the peripheral boundary, of said cushion space.

14. A vehicle as claimed in claim 13 wherein the flexible duct structure includes nozzle openings extending radially and providing radially extending fluid curtains for dividing the annular space defined by the curtains issuing from said annular nozzles into separate compartments.

15. A vehicle as claimed in claim 13 wherein at least some of said nozzles are arranged to receive fluid from said curtains for recirculation in one or another of said curtains.

16. A vehicle for lifting or transporting loads which in operation is supported above and clear of the ground or water by at least one cushion of air formed and contained beneath the vehicle comprising a base platform, means forming a series of nozzles positioned below said base platform and around the periphery thereof through which pressurized air is caused to issue, with an inward component, to form the air cushion, a skirt of flexible material suspended around the periphery of said base platform, and means for supplying pressurised air to said nozzles.

17. A ground effect vehicle comprising a base structure, and means carried by said base structure for producing a pressurised air cushion beneath the vehicle, said means including at least one jet having inner and outer walls, the inner wall of said jet being formed at least in part by a flexible wall member which depends from said base structure and forms a barrier to the outward escape of air from said air cushion.

18. A vehicle of the type adapted for travelling or hovering over surfaces of land or water comprising a main body, means for producing a pressurised cushion of gas beneath said body capable of at least partially supporting the vehicle above the surface over which it is travelling or hovering, said cushion producing means having a part which is flexibly attached to said body so as to be capable of vertical movement relative thereto in response to variations in the height of said body relative to said surface, and means for causing at least one curtain of moving fluid to issue from said part and flow towards said surface and to at least partially contain said pressurised cushion of gas.

19. A vehicle for travelling over a surface of the type which in operation is supported above said surface by at least one cushion of pressurised gas formed and contained beneath the vehicle comprising a main body, a structure connetced to and mounted beneath said main body and capable of deflection relative to said body, means for causing fluid to issue from said structure in the form of a curtain of moving fluid flowing towards the surface over which the vehicle is supported and partially enclosing said cushion of pressurised gas, and flexible means extending between said structure and said main body and cooperating with said curtain of moving fluid to complete the enclosure of said cushion.

No references cited.

A. HARRY LEVY, *Primary Examiner.*
PHILIP ARNOLD, *Examiner.*

UNITED STATES PATENT OFFICE
CERTIFICATE OF CORRECTION

Patent No. 3,182,740                                          May 11, 1965

Christopher Sydney Cockerell

It is hereby certified that error appears in the above numbered patent requiring correction and that the said Letters Patent should read as corrected below.

Column 1, line 16, for "845,211" read -- 854,211 --.

Signed and sealed this 12th day of October 1965.

(SEAL)
Attest:

ERNEST W. SWIDER
Attesting Officer

EDWARD J. BRENNER
Commissioner of Patents